United States Patent [19]
Wiesmeier et al.

[11] Patent Number: 4,947,038
[45] Date of Patent: Aug. 7, 1990

[54] PROCESS AND ARRANGEMENT FOR OPTICALLY MEASURING A PHYSICAL QUANTITY

[75] Inventors: Albert Wiesmeier, Merklingen; Manfred Griesinger, Leonberg, both of Fed. Rep. of Germany

[73] Assignee: Daimler-Benz AG, Fed. Rep. of Germany

[21] Appl. No.: 398,259

[22] Filed: Aug. 24, 1989

[30] Foreign Application Priority Data

Aug. 24, 1988 [DE] Fed. Rep. of Germany ....... 3828651

[51] Int. Cl.$^5$ .............................................. H01J 5/16
[52] U.S. Cl. ................................ 250/227.23; 250/226
[58] Field of Search ..................... 250/226, 227, 231 R

[56] References Cited

U.S. PATENT DOCUMENTS

| | | | |
|---|---|---|---|
| 4,607,158 | 8/1986 | Ovren | 250/227 |
| 4,616,137 | 10/1986 | Goff et al. | 250/227 |
| 4,705,354 | 11/1987 | Ulrich | 350/231 R |
| 4,880,972 | 11/1989 | Brogardh et al. | 250/231 R |

Primary Examiner—David C. Nelms
Assistant Examiner—Khaled Shami
Attorney, Agent, or Firm—Evenson, Wands, Edwards, Lenahan & McKeown

[57] ABSTRACT

In a process and arrangement for measuring a physical quantity using an optical sensor, for imparting a power modulation proportional to the measured quantity on an effective light flux, the physical quantity being obtained from a ratio of the luminous power of the effective light flux to that of a reference light flux, to achieve a high path neutrality of an optical transmission path, the spectral distribution $S(\lambda)$ of the effective light flux and the spectral distribution $R(\lambda)$ of the reference light flux is selected according to the relation:

$$\int_{\lambda_1}^{\lambda_2} \lambda \cdot S(\lambda)d\lambda \cdot \int_{\lambda min}^{\lambda max} R(\lambda)d\lambda = \int_{\lambda_1}^{\lambda_2} S(\lambda)d\lambda \cdot \int_{\lambda min}^{\lambda max} \lambda \cdot R(\lambda)d\lambda$$

with $\lambda min < \lambda_1 < \lambda_2 < \lambda max$, the light source being emitting in the wave range between the wavelengths $\lambda min$ and $\lambda max$.

13 Claims, 6 Drawing Sheets

PROCESS AND ARRANGEMENT FOR OPTICALLY MEASURING A PHYSICAL QUANTITY

BACKGROUND AND SUMMARY OF THE INVENTION

The invention relates to a process and arrangement for measuring a physical quantity by means of an optical sensor which impresses a power modulation on an effective light flux $I_1$ in a monotonic correlation with changes of the measured quantity.

German Published Unexamined Patent Application (DE-OS) No. 2,903,821 discloses the provision of encoding a measured quantity using a ratio of light intensities of two part light fluxes, one of which, the effective light flux, is subjected to an intensity modulation proportional to the measured quantity, while the other, the reference light flux, remains unaffected by the measured quantity, the two part light fluxes being generated by division of a primary light flux emitted from a single light source.

The intensity modulation of the effective light flux takes place, for example, by means of a diaphragm in the form of a wedge gap which can be displaced back and forth transversely to the effective light flux in relation to the measured quantity. Depending on whether the measured quantity increases or decreases, this diaphragm occludes more or less of the cross-sectional area of the beam.

For the case where the measured quantity is a temperature, a bimetal strip, exposed to this temperature, may be used to displace the diaphragm proportional to the measured quantity wherein one end of the bimetal strip executes deflection movements proportional to the temperature. Wherever the part light fluxes to be subjected to the intensity comparison are guided to remotely arranged photodetectors via an individual optical fiber, the light fluxes are also exposed hereby, i.e. part from the intensity modulation of the effective light flux proportional to the measured quantity, generally, to different factors which influence the light intensity and impair the accuracy of the measurement. Such significant influences include changes in the transmission paths caused by, for example, variations in reflectively occurring at ends of the optical fiber and/or on optical elements for directing the light fluxes into the respective optical fiber and for directing light fluxes onto the respective detector. Such variations, therefore, can influence the measuring result.

In order to avoid measuring errors resulting from such differences in transmission paths, German Published Unexamined Patent Application (DE-OS) No. 2,903,821 discloses guiding the effective light flux and the reference light flux in each case via the same fiber-optic transmission path, so that these influences act in a same way on the light fluxes to be compared with each other and are at the same time eliminated during ratioing.

In order to separate the two light fluxes from each other in a simple way, it is then necessary to generate them in different spectral distribution. Spectral images suitable for this are known from the technique of optical telecommunication in wavelength division multiplexing mode (Hans F. Mahlein, Elektronik 13, 1983, pages 80–86).

However, it is disadvantageous in this case that, due to their dispersion characteristics for light fluxes of different wavelength, optical fibers also have a different attenuation, which in turn impairs the measuring accuracy.

To avoid the disadvantage explained thus far, the process disclosed by German Published Unexamined Patent Application (DE-OS) No. 3,528,294 is suitable.

According to the process of (DE-OS) No. 3,528,294, the physical quantity to be measured is determined from a ratio of the luminous powers of an effective light flux $I_1$ and a reference light flux $I_2$, the light fluxes $I_1$, and $I_2$ being guided via the same optical fibers from a light source to a sensor imparting a power modulation to at least the effective light flux $I_1$. The fluxes $I_1$ and $I_2$ are guided by common optic fibers to a detector and evaluation unit, in which a power measurement and evaluation are carried out in units of the measured quantity. Both the effective light flux $I_1$ and the reference light flux $I_2$ each have a comb-shaped spectral distribution with a plurality of components in the form of spectral lines, the effective light flux $I_1$ and the reference light flux $I_2$ being nested one in the other in spectral terms, so that the two light fluxes have the same or approximately the same mean optical frequency. This is intended to ensure that the two light fluxes are exposed to the same influences by the transmission path, irrespective of the power modulation, and to that extent a path-neutral transmission of the light fluxes imparting the spectral coding of the measured quantity becomes possible. As a result, the influences of optical transmission and coupling elements present in the measurement path act in the same way on the two light fluxes and therefore cancel each other out.

However, a disadvantage of this process is that interference filters of complicated design are required both in the sensor and in the detector unit because of the plurality of the spectral components of the effective light flux and of the reference light flux. These filters have to be tuned exactly in terms of their transmission properties to identical spectral distributions, thus involving a high technical outlay. The filter arrangements, which can be positioned very far away from one another in terms of space, are very easily disturbed, for example when the sensor filter arrangement is exposed to different ambient conditions, for example, a higher temperature than the detector filter arrangement, with the adverse result that the filters are out of tune with one another and the accuracy of the measurement is considerably impaired.

Accordingly an object of the present invention is to provide an improved process of the type mentioned in the introduction, to the effect that the technical outlay necessary for carrying out the process is appreciably reduced and, at the same time, a reduction of the influence of disturbance variables on the measurement result is also obtained.

A further object of the present invention is to provide arrangements suitable for carrying out the process of the invention.

In accordance with the process of the present invention a spectral coordination of the effective light flux $I_1$ and the reference light flux $I_2$ is achieved such that the spectral distribution $S(\lambda)$ of the effective light flux $I_1$ and the spectral distribution $R(\lambda)$ of the reference light flux $I_2$ have the same effective wavelength $\lambda z$. As a result, a very good path neutrality of the transmission of the optical signals in a fiber-optical transmission path is obtained, specifically even when their transmission varies linearly with the wavelength, this usually being true in a good approximation.

This will be demonstrated in detail by the following consideration:

Starting from a constant transmission $$T_1(\lambda) = c_1$$

of the fiber-optical transmission path and a sensor setting linked to a predetermined value of the measured quantity x, with an associated spectral distribution $S(\lambda,x)$ of the effective light flux and spectral distribution $R(\lambda,x)$ of the reference light flux, the intensity values $I_{S1}$ and $I_{R1}$ in a signal or effective-light detection channel are obtained according to the relations $$I_{S1} = C_1 \int S(\lambda,x) d\lambda \tag{1}$$

and $$I_{R1} = C_1 \int R(\lambda,x) d\lambda. \tag{2}$$

For a transmission linearly dependent on the wavelength $\lambda$, according to the relation $$T_2(\lambda) = C_2(1+a\lambda) \tag{3}$$

for the intensity $I_{S2}$ in the effective-light detection channel there is the relation $$I_{S2} = C_2 \int (1+a\lambda) \cdot S(\lambda,x) d\lambda \tag{4}$$

and for the intensity $I_{R2}$ of the reference-light flux there is the relation $$I_{R2} = C_2 \int (1+a\lambda) \cdot R(\lambda,x) d\lambda. \tag{5}$$

Path neutrality is obtained when the following is true:

$$I_{S1}/I_{R1} = I_{S2}/I_{R2} \tag{6}$$

By substituting the relations (1), (2) and (4), (5) in the relation (6), after a simple conversion the following relation is obtained:

$$\int \lambda \cdot R(\lambda,x) d\lambda / \int R(\lambda,x) d\lambda = \int \lambda \cdot S(\lambda) d\lambda / \int S(\lambda,x) d\lambda \tag{7}$$

this being equivalent to stating that the centers of gravity $\lambda_z$ of the original signal and reference spectrum must coincide.

However, this relationship (7) can be complied with in a very close approximation by means of filters of simple design, for example, by means of interference filters which can be of substantially simpler construction than the filter arrangements necessary in the use of the process disclosed by (DE-OS) No. 3,528,294 and which are therefore also less sensitive to varying ambient influences.

Such an arrangement with interference filters used both as spectral filters and as beam splitters or beam unifiers contemplated by one embodiment of the present invention.

In an embodiment of the arrangement for carrying out the process according to the invention, the separation of the signal light flux, utilized for the intensity comparison, from the reference light flux is possible electronically, so that, in principle, a single spectral filter provided within the frame of the sensor device is sufficient.

Alternatively to a neutral wedge provided as a sensor element according to one embodiment of the arrangement and shiftable in relation to the measured quantity, a spectral wedge for the power modulation of the effective light flux can be used especially advantageously, with the result that an especially simple overall construction of the arrangement can be obtained. By means of an additional absorption filter which, in the reference light flux, largely suppresses the spectral components utilized for the effective light flux, improved dynamics with the effect of an increased range of variation of the ratio $I_1/I_2$ are achieved, thus making an especially good signal-to-noise ratio possible.

Diffraction elements with a locally variable diffraction coefficient can also be provided as movable, sensor elements.

In an arrangement according to a further embodiment it is possible in a simple way to adjust the spectral center of gravity of the reference light flux in a controlled way and/or keep it at a specific wavelength $\lambda_z$ by means of a control which is obtained in a simple way.

Other objects, advantages and novel features of the present invention will become apparent from the following detailed description of the invention when considered in conjunction with the accompanying drawings.

DETAILED DESCRIPTION OF THE DRAWINGS

Figure 1:
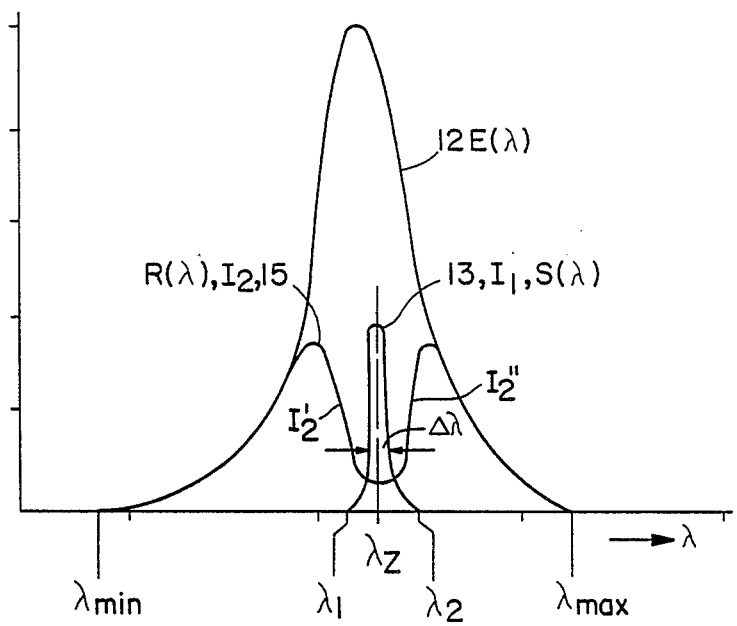
FIG. 1 illustrates a diagram explaining the process according to the invention.

The fiber-optical sensors, generally indicated by reference numeral 10 in FIGS. 2 to 6, work on the joint principle of detecting a physical measured quantity x from an intensity ratio or luminous power ratio of two light fluxes $I_1$ and $I_2$ which are influenced differently by a sensor element, for example, a neutral wedge 11 shiftable in proportion to a measured quantity.

The purpose of these fiber-optical sensors 10 is to prevent, as far as possible, the influence of spectral transmission changes of the transmission system on the ratio $I_1/I_2$ fluxes $I_1$ and $I_2$, a typical spectral distribution being shown in FIG. 1. Because the ratio can be taken as a reliable criterion for the measured quantity x, the arrangement of the fiber-optical sensors 10 provide as good a path neutrality as possible for the fiber-optical transmission system as a whole.

The process by which the work is carried out by the fiber-optical sensors 10 also emerges from the functional description of the sensors.

It will be assumed first that the light source is a voltage-controlled light-emitting diode (LED) which emits an exit light flux with a relatively wide-band spectral distribution E ($\lambda$) between wavelengths $\lambda_{min}$ and $\lambda_{max}$, the spectral distribution E($\lambda$) of the exit light flux being represented in FIG. 1 by an emission curve 12.

Filtered out from this exit light flux 12 of the light source by a filter, for example by means of an interference filter, is an effective light flux $I_1$ having a spectral distribution S($\lambda$) which is represented in FIG. 1 by a narrower spectral distribution curve 13 between the wavelengths $\lambda_1$ and $\lambda_2$.

The light flux utilized as a reference light flux $I_2$, represented in FIG. 1 by a spectral distribution curve 15, forms a spectral complement to the effective light flux $I_1$ and has a spectral distribution R($\lambda$). As shown by curve 15, the reference light flux $I_2$ comprises two part light fluxes $I'_2$ and $I''_2$ in an approximately symmetrical spectral distribution in relation to a central wavelength $\lambda_z$, which is the central wavelength of the effective light flux $I_1$.

The filter, by which the effective light flux $I_1$ is filtered out from the exit light flux of the light source, is tuned to the spectral distribution 12 of the exit light flux so that the spectral distribution S($\lambda$) of the effective light flux $I_1$ and the spectral distribution R($\lambda$) of the reference light flux $I_2$ have the following relation:

$$\int_{\lambda_1}^{\lambda_2} \lambda \cdot S(\lambda)d\lambda \cdot \int_{\lambda_{min}}^{\lambda_{max}} R(\lambda)d\lambda = \int_{\lambda_1}^{\lambda_2} S(\lambda)d\lambda \cdot \int_{\lambda_{min}}^{\lambda_{max}} \lambda \cdot R(\lambda)d\lambda$$

With such a coordination of the spectral distribution S($\lambda$) of the effective light flux $I_1$ and the spectral distribution R($\lambda$) of the reference light flux $I_2$, entailing that the effective light flux $I_1$ and the reference light flux $I_2$ have the same central wavelength $\lambda_z$ as an effective wavelength, the best possible path neutrality of the fiber-optical transmission system is obtained.

On the assumption that influences occurring in the particular fiber-optical transmission system act in the same way on the effective light flux $I_1$ and the reference light flux $I_2$, this being true when these pass along, essentially, the same optical paths and/or when a wavelength dependence of such influences is linear, so that the transmission of the fiber-optical transmission system is linearly dependent on the wavelength, a path-neutral value, that is to say one characteristic of the measured quantity itself, is always obtained for the ratio of the intensities of the effective light flux $I_1$ and the reference light flux $I_2$, even when the effective light flux is itself subjected to a change proportional to the measured quantity.

The spectral distribution of the effective light flux $I_1$ and of the reference light flux $I_2$, as shown in FIG. 1, can be achieved in various ways. As already mentioned, this spectral distribution can be achieved by filtering the effective light flux $I_1$ out from the exit light flux 12 of the light source by an interference filter and, for the sensing of the measured quantity, guiding the filtered exit light flux 12 to a neutral wedge 11 which experiences a shift correlated monotonically with the measured quantity, with the result that the effective light flux $I_1$ experiences a change proportional to the measured quantity, and on the other hand by using, instead of such a neutral wedge 11, a "spectral wedge" 17 (FIGS. 4 and 5) which only in a narrow-band spectral range possesses a high absorption capacity which is local in the direction in which the spectral wedge 17 experiences a shift proportional to the measured quantity. When such a spectral wedge 17 is used, for the reference light flux $I_2$ use is made of that part of the exit light flux of the light source which is not influenced by the spectral wedge, but which is itself influenced by the particular position of the spectral wedge.

Figure 2:
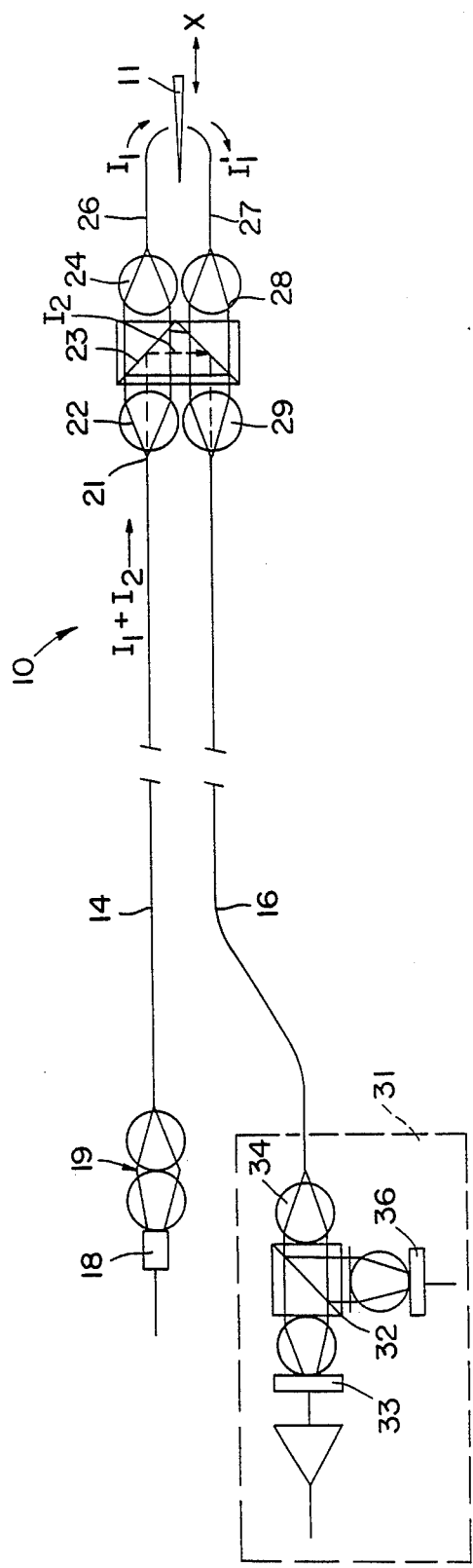
FIG. 2 shows a first exemplary embodiment of a fiber-optical measuring arrangement according to the invention in a simplified representation in the form of a block diagram.

In order to explain various exemplary embodiments of fiber-optical sensors 10 embraced by the idea of the invention, reference must first be made to the relevant details of FIG. 2.

In the fiber-optical sensor 10 according to FIG. 2, the light source 18 is an LED having an emission spectrum which is reproduced by the spectral curve 12 of FIG. 1. The light emitted by this light source 18 is fed into the first optical fiber 14 by a spherical lens plug designated as a whole by 19.

On an exit side 21 of the optical fiber 14, emerging light flux is collimated, for example by means of a spherical lens 22, and, after collimation, strikes an interference filter 23 which, in the special exemplary embodiment illustrated, is inclined at about 45° relative to an optical axis of the spherical lens 22. The filter 23 is transmissive to the effective light flux $I_1$ represented by the spectral distribution curve 13 of FIG. 1 and is highly reflecting for the part reference light fluxes $I'_2$ and $I''_2$ which together form the reference light flux $I_2$. The effective light flux $I_1$, transmitted by the interference filter 23, is focused, by a second spherical lens 24, on an entry end of an optical fiber 26 provided as a light-guide element and is guided to the neutral wedge 11 which is located in a narrow gap between optical fiber 26 and a leading-on optical fiber 27 of the sensor.

Further optical elements, which would have to be provided in the region of the neutral wedge 11 for collimating the effective light flux onto the neutral wedge 11 or for the renewed focusing on the entry end of the leading-on optical fiber 27, are not shown specifically for the sake of greater simplicity of the illustration.

The light flux $I_1'$, emerging at an exit end of optical fiber 27 is collimated once again by a spherical lens 28 and, will have experienced an attenuation or a reduction of the attenuation proportional to the measured quantity and to that extent contains information on the measured quantity. A further spherical lens 29 and a beam unifier located between the latter and the spherical lens 28 focuses the light flux I', with the reference light flux $I_2$ previously reflected by the interference filter 23, onto the entry end of an optical fiber 16 leading to a detector arrangement 31.

In the exemplary embodiment according to FIG. 2, this detector arrangement 31 comprises an interference filter 32 which is transmissive for the spectral range of the effective light flux $I_1'$ and reflective for the spectral range of the reference light flux $I_2$ ($I_2 = I_2' + I_2''$). The effective light flux $I_1'$ passing through the interference filter 32 strikes a first photodiode 33 which accordingly generates an electrical output signal proportional to the intensity of the effective light flux $I_1'$. The reference light flux $I_2$ reflected by the interference filter 32, which is inclined at about 45° relative to the optical axis of a spherical lens 34 provided for the collimation of a radiant energy onto the interference filter 32, strikes a second photodiode 36 which generates an electrical output signal proportional to the intensity of the reference light flux $I_2$. The measured quantity can then be determined appropriately from an evaluation of the electrical output signals from the two photodiodes 33 and 36 of the detector arrangement 31.

Figure 3:
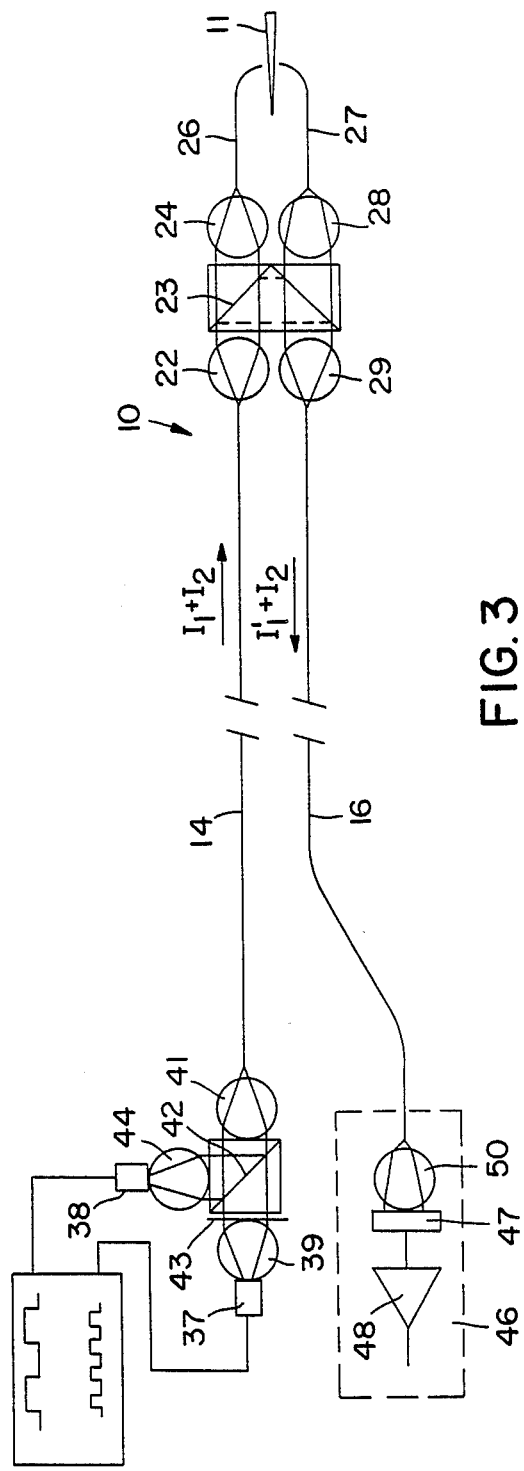
FIGS. 3 and 4 show exemplary embodiments, alternative to the measuring arrangement according to FIG. 1, of functionally corresponding measuring arrangements, each in a representation corresponding to that of FIG. 1.

In the exemplary embodiment according to FIG. 3, as regards the sensor arrangement the same design and arrangement of the optical elements as in the exemplary embodiment according to FIG. 2 are provided. In contrast to this, however, there are two light sources 37 and 38, one of which, light source 37, is used as an effective light signal transmitter and the other of which, light source 38, is used as a reference signal transmitter.

In the beam path for feeding both the effective light flux $I_1$ and the reference light flux $I_2$ into the optical fiber 14 leading to the sensor, a first interference filter 42 is positioned between a spherical collimating lens 39 and a spherical focusing lens 41 by means of which the reference signal flux $I_2$ is fed, by the use of the spherical focusing lens 41, into the optical fiber leading to the sensor. Arranged between this first interference filter 42 and a spherical collimating lens 39 collimating the effective light flux $I_1$ is a second interference filter 43 which is of a narrower band than the first interference filter 42 and which determines the spectral distribution 13 (FIG. 1) of the effective light flux $I_1$. A spherical collimating lens 44 is also arranged between the reference signal source 38 and the first interference filter 42.

In the exemplary embodiment according to FIG. 3, the detector arrangement 46 comprises only a single photodiode 47 with a following amplifier 48. The light flux $I_1' + I_2$ which contains the information on the measured quantity and which is guided to the detector arrangement 46 via the optical fiber 16 is collimated onto the photodiode 47 by means of a spherical collimating lens 50.

The two light sources, namely the signal light source 37 and the reference light source 38, are clocked with electrical pulses of differing frequency.

It is thereby possible to separate the effective light flux $I_1'$ from the reference light flux $I_2$ electronically, for example by means of frequency filters connected to the output of the amplifier 48 and a phase-sensitive rectification of the output signals of these frequency filters with control signals for the two light sources 37 and 38. In this case too, it is possible for the intensity ratios of the output currents of the frequency filters to be evaluated in a simple way in units of the measured quantity.

Figure 4:
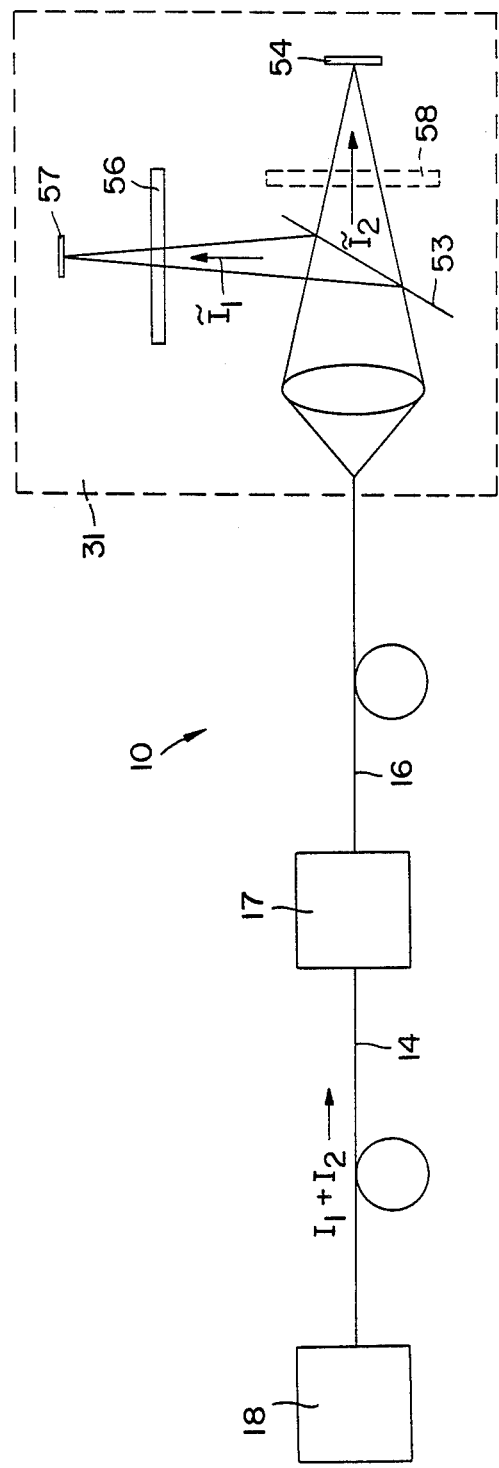

To explain the basic construction of a further exemplary embodiment of the fiber-optical sensor 10 according to the invention, reference is made to FIG. 4. This exemplary embodiment corresponds, in terms of its basic construction, to that according to FIG. 2. However, it differs in that the sensor element is designed to be shiftable in relation to the measured quantity x, which here is designed as a spectral wedge sensor 17 having the property of influencing, proportionally to the measured quantity x, a central spectral range of the light flux $I_1 + I_2$ emitted by the LED 18 which is guided to the spectral wedge 17 via an optical fiber 14. The spectral wedge 17 provides an attenuation when the measured quantity increases, or a reduction of the attenuation, when the measured quantity decreases again.

Figure 5:
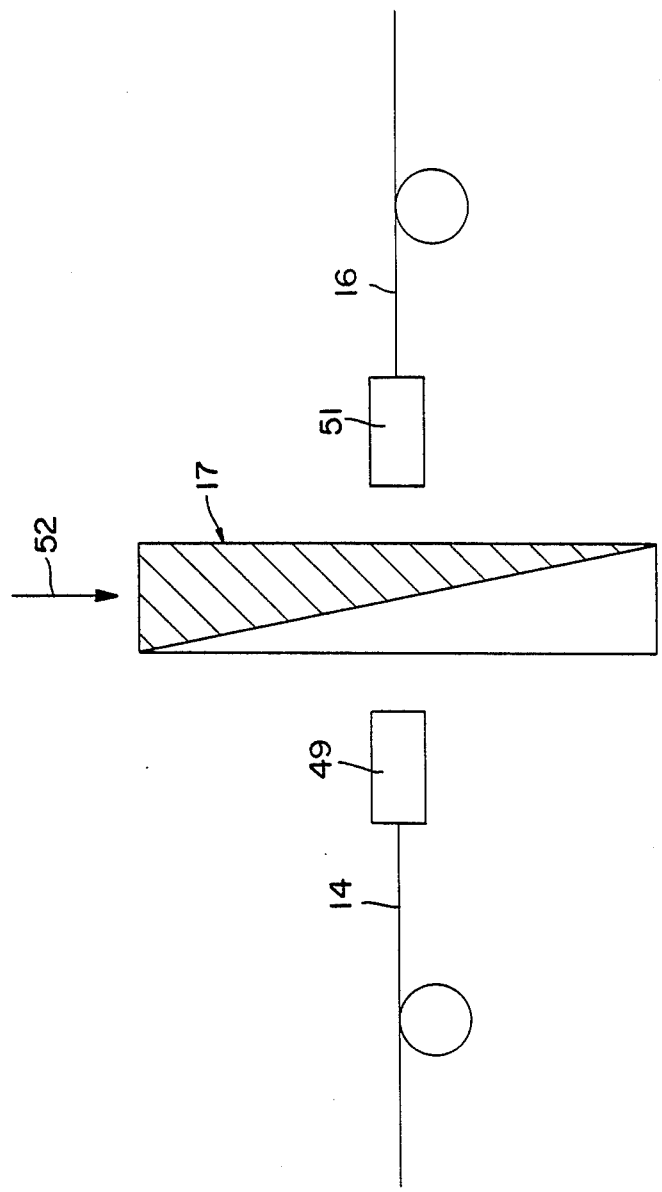
FIG. 5 shows details of a sensor element which can be used within the scope of the arrangement according to FIG. 4 and which imparts the power modulation of the effective light flux proportional to the measured quantity.

A spectral wedge sensor 17 of this type can, in terms of its basic construction, be produced in the form illustrated in FIG. 5, in particular as a color-filter wedge plate which is arranged between a collimating optical system 49 and a focusing optical system 51. The spectral wedge sensor 17 is shiftable at right angles to the optical axis of these two systems, the assumption being that this plate shifts in the direction of the arrow 52 when the measured quantity increases and in the opposite direction when the measured quantity decreases again. The detector arrangement can be produced in the same way as the correspondingly designated detector arrangement according to FIG. 2.

In a special design of the detector arrangement 31 illustrated in FIG. 4, a beam splitter 53 divides the exit light flux of the sensor 17 into two part light fluxes $\bar{I}_2$ and $\bar{I}_1$. The part light flux $\bar{I}_2$ passing through the beam splitter 53 strikes a first photodiode 54, and the part light flux $\bar{I}_1$ reflected by the beam splitter 53 is guided through an absorption filter 56 which is highly absorptive in that spectral range in which the spectral wedge sensor 17 is of an absorption variable in a path-dependent manner. The exit light flux of this absorption filter is detected by a second photodiode 57.

Thus, the second photodiode 57 supplies a signal which is a criterion for the intensity of the exit light flux of the light source 18, minus that spectral range in which the spectral wedge 17 is of variable absorption. In contrast, the output signal of the first photodiode 54 is a criterion for the intensity of the exit light flux of the light source with a central, spectral portion of its emission spectrum varying with the measured quantity. Here too, once again the ratio of the output signals of the two photodiodes 54 and 57 is a criterion for the measured quantity itself.

As represented by broken lines, in an advantageous modification of the detector 31, between the beam splitter 53 and the first photodiode 54 there is a spectral filter 58 which is highly transmissive approximately and preferably only in that spectral range for which the absorption filter 56 positioned between the beam splitter 53 and the second photodiode 57 is of high absorption. By such a filter 58, the optical dynamics of the sensor arrangement can be improved, to the effect that the ratio of the output signals of the two photodiodes 54 and 57 varies more sharply with the measured quantity.

Figure 6:
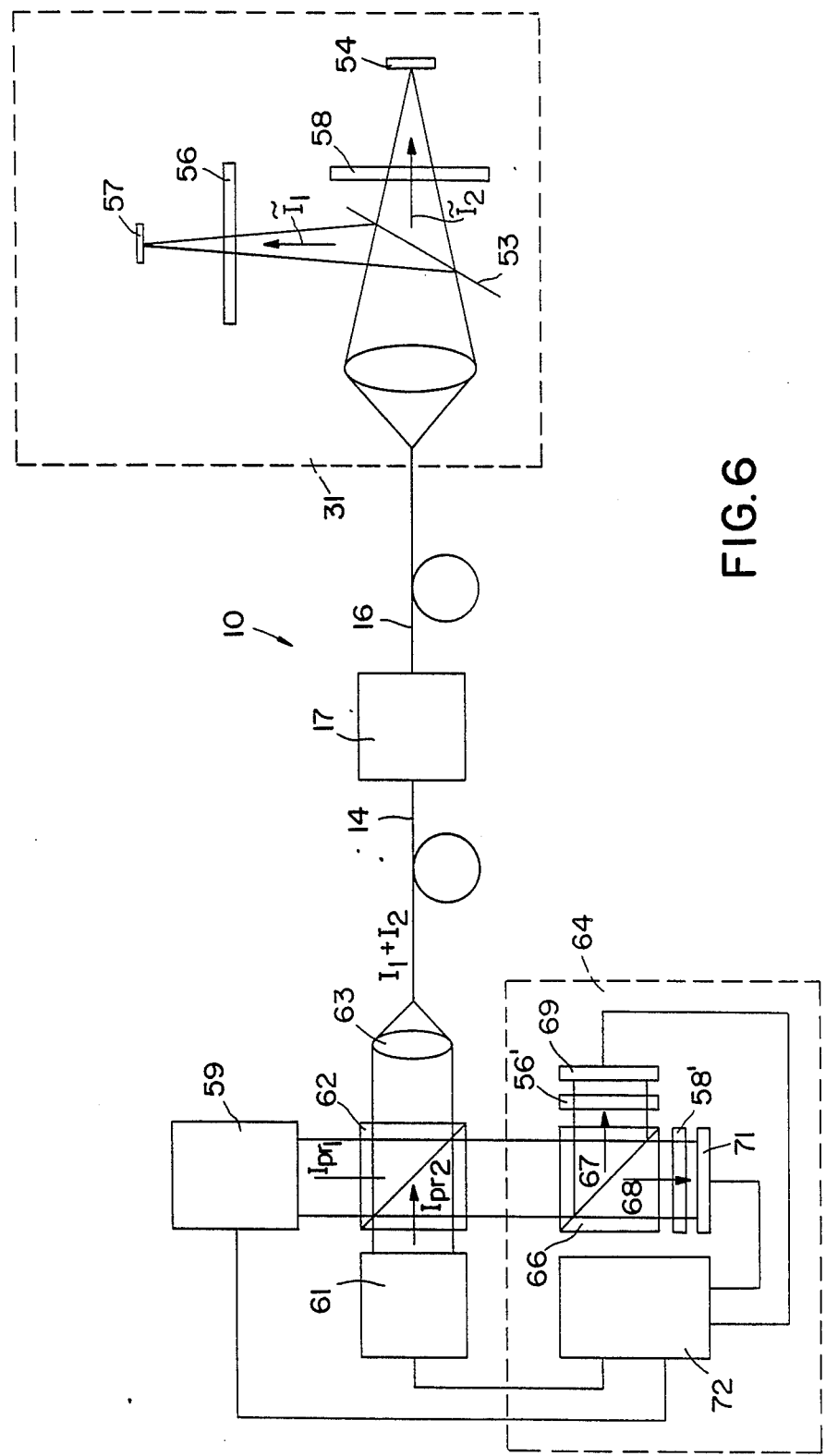
FIG. 6 shows a further exemplary embodiment of an arrangement according to the invention with a variable emission characteristic of a light source, in a representation corresponding to those of FIG. 1 to 4.

The exemplary embodiment according to FIG. 6 differs from that according to FIG. 4, in the design of the light source which generated the light flux $I_1 + I_2$ fed into the first optical fiber 14 and guided to the sensor 17 and, in that there is a stabilizing device, generally designated at 64, which ensure the spectral distribution of this light flux $I_1 + I_2$ according to the relations (6) and (7).

In this exemplary embodiment, the light source includes two LED's 59 and 61 having exit light fluxes $I_{pr1}$ and $I_{pr2}$, respectively, which are superposed on one another by a beam unifier 62 and are focused by a focusing lens 63 on the entry of the optical fiber 14 leading to the spectral wedge 17.

These light sources 59 and 61 are selected in terms of their spectral emission in such a way that their omission maximums, according to the above-mentioned relations, are symmetrical relative to the wavelength $\lambda_z$ or to the spectral interval, within which the spectral wedge sensor 17 and the absorption filter 56 are absorbent and the transmission filter 58, present where appropriate, is of high transmission.

The purpose of the stabilizing device 64 is to stabilize the spectral distribution of the light flux $I_1+I_2$, to the effect that an effective wavelength $\lambda_z$ remains stable in the wavelength scale regardless of ambient influences acting on the LED's 59 and 61. This can be obtained in a good approximation by an appropriate control of the current supply of the two light sources.

The stabilizing device 64 comprises a further beam splitter 66, which receives light emerging from the beam unifier 62, distribution of which corresponds to that of the light flux $I_1+I_2$ fed into the optical fiber 14. The two exit light fluxes of the further beam splitter 66 which are represented by the arrows 67 and 68 and which have the same spectral composition as the light flux $I_1+I_2$ are guided respectively via filters 56', 58' to photodetectors 69, 71, respectively, of the stabilizing device 64. One spectral filter 56' is an absorption filter having the same absorption properties as the absorption filter 56 of the detector unit 31. The filter 58' arranged between the other photodetector 71 and the beam splitter 66 is a transmission filter which has the same transmission properties as the transmission filter 58 of the detector unit 31.

Output signals of the two photodetectors 69 and 71 are fed to an electronic control unit 72 which, as a result of internal processing of the detector output signals, controls the supply voltages of the LED's 59 and 61 in such a way that the effective wavelength $\lambda_z$ of the light flux $I_1+I_2$ is maintained. In a special design of the electronic control unit 72, a processing suitable for this and carried out by the electronic control unit 72 involves comparing the ratio of the output-signal levels of the two photodetectors 69 and 71 of the stabilizing device 64 with one another and generating supply-voltage output signals for the two LED's 59 and 61, in such a way that the ratio of the output-signal levels of the two photodetectors 69 and 71 remains constant.

The electronic circuitry measures necessary for producing the control unit 72 are immediately available to the average person skilled in the art because of his specialized knowledge, provided that he is aware of the purpose of the electronic control unit 72, so that there seems to be no need for a detailed explanation of this.

A sensor filter, which was explained as a spectral wedge sensor 17 in the exemplary embodiments according to FIGS. 4 and 6, can, in a form alternative to this, also be designed as a diffraction element, the diffraction coefficient of which is locally dependent.

Such a diffraction element can be produced, for example, as a holographic volume phase grid, the diffracting structure of which is obtained by achieving an appropriately variable effect of the diffraction structure as a result of a locally dependent holographic exposure of the exposure-sensitive layer.

The advantage of such a form of a spectral wedge sensor is that the diffracting structure can be designed as a relatively thin layer, in which case the wavelength at which such an element is to be highly absorbent and/or reflecting, in diffracting manner, can be predetermined very exactly as a result of the geometrical dimensioning of this structure, and that such an element can also be produced very cheaply.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A process for measuring a physical quantity comprising the steps of:
   (a) forming an effective light flux $I_1$ having a spectral distribution $S(\lambda)$ between wavelengths $\lambda$, and $\lambda_1$ and a reference light flux $I_2$ having a spectral distribution $R(\lambda)$ from an exit light flux having a wide-band spectral distribution $E(\lambda)$ between wavelengths $\lambda \min$ and $\lambda \max$, wherein $\lambda \min < \lambda_1 < \lambda_2 < \lambda \max$;
   (b) tuning the spectral distribution $S(\lambda)$ of the effective light flux $I_1$ and the spectral distribution $R(\lambda)$ of the reference light flux $I_2$ so that $$\int_{\lambda_1}^{\lambda_2} \lambda \cdot S(\lambda) d\lambda \cdot \int_{\lambda \min}^{\lambda \max} R(\lambda) d\lambda = \int_{\lambda_1}^{\lambda_2} S(\lambda) d\lambda \cdot \int_{\lambda \min}^{\lambda \max} \lambda \cdot R(\lambda) d\lambda;$$

(c) impressing a power modulation on the effective light flux $I$ in a monotonic relationship with changes in the physical quantity; and
   (d) forming a ratio $I_1/I_2$ of a luminous power of the effective light flux $I_1$ to that of the reference light flux $I_2$ to obtain the physical quantity.

2. An arrangement for measuring a physical quantity comprising:
   a light source means for emitting an exit light flux having a wide-band spectral distribution $E(\lambda)$ between wavelengths $\lambda \min$ and $\lambda \max$;
   a first filter means for forming an effective light flux $I_1$ having a spectral distribution $S(\lambda)$ between wavelengths $\lambda_1$ and $\lambda_2$ and a reference light flux $I_2$ having a spectral distribution $R(\lambda)$ from the exit light flux, the first filter means being tuned so that the spectral distribution $S(\lambda)$ of the effective light flux $I_1$ and the spectral distribution $R(\lambda)$ of the reference light flux $I_2$ have the following relationship:

$$\int_{\lambda_1}^{\lambda_2} \lambda \cdot S(\lambda) d\lambda \cdot \int_{\lambda \min}^{\lambda \max} R(\lambda) d\lambda = \int_{\lambda_1}^{\lambda_2} S(\lambda) d\lambda \cdot \int_{\lambda \min}^{\lambda \max} \lambda \cdot R(\lambda) d\lambda,$$

a sensor means for impressing a power modulation on the effective light flux $I_1$ in a monotonic relationship with changes in the physical quantity; and
   a detector means for forming a ratio $I_1/I_2$ of a luminous power of the effective light flux $I_1$ after power modulation by the sensor means to that of the reference light flux $I_2$ to obtain the physical quantity.

3. An arrangement according to claim 2, wherein the first filter means is a first interference filter, wherein the sensor means includes a beam unifier means which is an interference filter having a spectral transmission range and reflection range corresponds to that of the first interference filter, and wherein the detector means includes a detector interference filter which has the same transmission and reflection characteristic as the first interference filter, the detector means including a first photoelectric receiver means for receiving the effective light flux $I_1$, and a second photoelectric receiver means for receiving the reference light flux $I_2$ reflected by the detector interference filter.

4. An arrangement according to claim 2, wherein the light source means comprises a first light source means for generating a first light flux with a wide-band spectral distribution including the reference light flux $I_2$ and a second light source means for generating a second light flux from which the effective light flux $I_1$ is provided by filtering the second light flux through a narrow-band light source interference filter, wherein a further light source interference filter is arranged as a beam unifier means for unifying the first light flux and second light flux to form an exit light flux $I_1+I_2$, wherein the exit light flux $I_1+I_2$ of the further light source interference filter is guided via a first optical fiber means to the sensor means which includes a beam unifier means for combining the effective light flux $I_1$ subjected to the power modulation of the sensor means and the reference light flux $I_2$ into a second optical fiber leading back to the detector unit means after modulation of the effective light flux $I_1$ by the sensor means, wherein the first and second light sources means are light-emitting diodes which are pulsed at different frequencies by supply control voltages, and wherein the detector means includes only one photoelectric detector means for receiving the combined reference and effective light fluxes and for providing output signals to frequency filter means, an output of which is subjected to a phase sensitive rectification for evaluation with the control voltages of the first and second light source means to form the ratio $I_1/I_2$ of the luminous power of the effective light flux $I_1$ to that of the reference light flux $I_2$ to obtain the measured quantity.

5. An arrangement according to claim 2, wherein the sensor means includes a sensor element means for imparting the power modulation of the effective light flux, the sensor element means being a neutral wedge which experiences a shift proportional to the measured quantity and transverse relative to a direction of propagation of the effective light flux $I_1$.

6. An arrangement according to claim 2, wherein the sensor means include a sensor element means for imparting the power modulation of the effective light flux proportion to the measured quantity, the sensor element means being a spectral wedge which experiences a shift proportional to the measured quantity and transverse relative to a direction of propagation of the effective light flux $I_1$ and the reference light flux $I_2$ and which, as seen in its direction of shift, has a monotonically varying narrow-band transmission, and wherein the detector means include a detector beam splitter for guiding the effective light flux $I_1$, and the reference light flux $I_2$ to separate photodetector means, and wherein arranged between the detector beam splitter and one of the separate photodetector means is a transmission filter which has spectral high absorption in a same spectral range in which the spectral wedge has locally variable absorption.

7. An arrangement according to claim 6, wherein between the detector beam splitter and the other of the separate photodetector means of the detector means is a further transmission filter which transmits only in that spectral range in which the spectral wedge has a variable transmission.

8. An arrangement according to claim 2, wherein a sensor element means of the sensor means is a diffraction element with a locally variable diffraction efficiency.

9. Arrangement according to claim 8, wherein the sensor element means is designed as a holographic volume phase grid which can be used for transmission.

10. An arrangement according to claim 8, wherein the sensor element means is designed as a holographic reflection structure.

11. An arrangement according to claim 2, wherein the light source means includes two light sources having exit light fluxes which are fed into a first optical fiber means via a beam unifier, and wherein a operating voltage of at least one of the two light sources is adjustable.

12. An arrangement according to claim 11, wherein there is a stabilizing means for controlling supply voltages of the two light sources whereby an effective wavelength z of the spectral distribution of the exit light flux emerging from the beam unifier of the light source means and guided to the sensor means via a first optical fiber means maintains a predetermined value.

13. An arrangement according to claim 12, wherein the stabilizing means comprises a beam splitter for receiving, as an entry light flux, the exit light flux of the beam unifier of the light source means, which has the same spectral distribution as the exit light flux $I_1+I_2$ fed into the first optical fiber means, wherein one exit light flux of the beam splitter is fed to a first photodetector means via a filter absorbent in that spectral range in which the transmission of the sensor element means varies in a path-dependent manner, and a second exit light flux of the beam splitter being fed to a second photodetector via a further filter of high transmission in the spectral range in which the sensor element means exhibits a variation of its transmission proportional to the measured quantity, and wherein intensity-proportional output signals of the first and second photodetectors are fed to stabilizing means of an electronic control means which, from a comparison of the output signals of the first and second detectors, controls a voltage supply of the two light sources in such a way that a ratio of the output signals of the first and second photodetectors of the stabilizing means corresponds to a constant predetermined value.

* * * * *